United States Patent
Raman et al.

(10) Patent No.: US 9,401,861 B2
(45) Date of Patent: Jul. 26, 2016

(54) SCALABLE MAC ADDRESS DISTRIBUTION IN AN ETHERNET FABRIC SWITCH

(75) Inventors: Mythilikanth Raman, San Jose, CA (US); Mary Manohar, Santa Clara, CA (US)

(73) Assignee: BROCADE COMMUNICATIONS SYSTEMS, INC., San Jose, CA (US)

(*) Notice: Subject to any disclaimer, the term of this patent is extended or adjusted under 35 U.S.C. 154(b) by 213 days.

(21) Appl. No.: 13/425,238

(22) Filed: Mar. 20, 2012

(65) Prior Publication Data

US 2013/0003739 A1 Jan. 3, 2013

Related U.S. Application Data

(60) Provisional application No. 61/502,128, filed on Jun. 28, 2011.

(51) Int. Cl.
*H04L 12/56* (2006.01)
*H04L 12/721* (2013.01)
*H01L 45/02* (2006.01)

(52) U.S. Cl.
CPC ............... *H04L 45/66* (2013.01); *H01L 45/02* (2013.01)

(58) Field of Classification Search
CPC .......... H04L 45/66; H04L 45/02; H04L 45/54
See application file for complete search history.

(56) References Cited

U.S. PATENT DOCUMENTS

| | | |
|---|---|---|
| 5,390,173 A | 2/1995 | Spinney |
| 5,802,278 A * | 9/1998 | Isfeld et al. ............... 709/249 |
| 5,878,232 A | 3/1999 | Marimuthu |
| 5,959,968 A | 9/1999 | Chin |
| 5,973,278 A | 10/1999 | Wehrill, III |
| 5,983,278 A | 11/1999 | Chong |
| 6,041,042 A | 3/2000 | Bussiere |

(Continued)

FOREIGN PATENT DOCUMENTS

| | | |
|---|---|---|
| CN | 102801599 A | 11/2012 |
| EP | 0579567 | 5/1993 |

(Continued)

OTHER PUBLICATIONS

"Switched Virtual Internetworking moves beyond bridges and routers", Sep. 23, 1994, No. 12, New York, US.

(Continued)

*Primary Examiner* — David Oveissi
(74) *Attorney, Agent, or Firm* — Shun Yao; Park, Vaughan, Fleming & Dowler LLP (57) ABSTRACT

One embodiment of the present invention provides a switch. The switch includes a notification mechanism. The notification mechanism constructs a single message that contains a locally learned MAC address associated with a local device, a TRILL RBridge identifier associated with the switch, and an identifier of an interface associated with the MAC address. In some embodiments, the switch includes a data structure and an entry management mechanism. The data structure stores device information learned at a remote switch, wherein the device information includes a MAC address of a device, a TRILL RBridge identifier associated with the remote switch, an identifier of an interface coupled to the device, and a type indicator of the MAC address. The entry management mechanism manages an entry in the data structure based on the RBridge identifier and the interface identifier.

20 Claims, 7 Drawing Sheets

(56) References Cited

U.S. PATENT DOCUMENTS

| | | | |
|---|---|---|---|
| 6,085,238 A | 7/2000 | Yuasa | |
| 6,104,696 A | 8/2000 | Kadambi | |
| 6,185,214 B1 | 2/2001 | Schwartz | |
| 6,185,241 B1 | 2/2001 | Sun | |
| 6,438,106 B1 | 8/2002 | Pillar | |
| 6,542,266 B1 | 4/2003 | Phillips | |
| 6,633,761 B1 | 10/2003 | Singhal | |
| 6,771,610 B1 | 8/2004 | Seaman | |
| 6,873,602 B1 | 3/2005 | Ambe | |
| 6,956,824 B2 | 10/2005 | Mark | |
| 6,957,269 B2 | 10/2005 | Williams | |
| 6,975,581 B1 | 12/2005 | Medina | |
| 6,975,864 B2 | 12/2005 | Singhal | |
| 7,016,352 B1 | 3/2006 | Chow | |
| 7,173,934 B2 | 2/2007 | Lapuh | |
| 7,197,308 B2 | 3/2007 | Singhal | |
| 7,206,288 B2 | 4/2007 | Cometto | |
| 7,310,664 B1 | 12/2007 | Merchant | |
| 7,313,637 B2 | 12/2007 | Tanaka | |
| 7,315,545 B1 | 1/2008 | Chowdhury et al. | |
| 7,316,031 B2 | 1/2008 | Griffith | |
| 7,330,897 B2 | 2/2008 | Baldwin | |
| 7,380,025 B1 | 5/2008 | Riggins | |
| 7,430,164 B2 | 9/2008 | Bare | |
| 7,453,888 B2 | 11/2008 | Zabihi | |
| 7,477,894 B1 | 1/2009 | Sinha | |
| 7,480,258 B1 | 1/2009 | Shuen | |
| 7,508,757 B2 | 3/2009 | Ge | |
| 7,558,195 B1 | 7/2009 | Kuo | |
| 7,558,273 B1 | 7/2009 | Grosser, Jr. | |
| 7,571,447 B2 | 8/2009 | Ally | |
| 7,599,901 B2 | 10/2009 | Mital | |
| 7,688,736 B1 | 3/2010 | Walsh | |
| 7,688,960 B1 | 3/2010 | Aubuchon | |
| 7,690,040 B2 | 3/2010 | Frattura | |
| 7,706,255 B1 | 4/2010 | Kondrat et al. | |
| 7,716,370 B1 | 5/2010 | Devarapalli | |
| 7,720,076 B2 * | 5/2010 | Dobbins | H04L 12/1886 370/395.52 |
| 7,729,296 B1 | 6/2010 | Choudhary | |
| 7,787,480 B1 | 8/2010 | Mehta | |
| 7,792,920 B2 | 9/2010 | Istvan | |
| 7,796,593 B1 | 9/2010 | Ghosh | |
| 7,808,992 B2 | 10/2010 | Homchaudhuri | |
| 7,836,332 B2 | 11/2010 | Hara | |
| 7,843,906 B1 | 11/2010 | Chidambaram et al. | |
| 7,843,907 B1 | 11/2010 | Abou-Emara | |
| 7,860,097 B1 | 12/2010 | Lovett | |
| 7,898,959 B1 | 3/2011 | Arad | |
| 7,924,837 B1 | 4/2011 | Shabtay | |
| 7,937,756 B2 | 5/2011 | Kay | |
| 7,949,638 B1 | 5/2011 | Goodson | |
| 7,957,386 B1 | 6/2011 | Aggarwal | |
| 8,018,938 B1 | 9/2011 | Fromm | |
| 8,027,354 B1 | 9/2011 | Portolani | |
| 8,054,832 B1 | 11/2011 | Shukla | |
| 8,068,442 B1 | 11/2011 | Kompella | |
| 8,078,704 B2 | 12/2011 | Lee | |
| 8,102,781 B2 | 1/2012 | Smith | |
| 8,102,791 B2 | 1/2012 | Tang | |
| 8,116,307 B1 | 2/2012 | Thesayi | |
| 8,125,928 B2 | 2/2012 | Mehta | |
| 8,134,922 B2 | 3/2012 | Elangovan | |
| 8,155,150 B1 | 4/2012 | Chung | |
| 8,160,063 B2 | 4/2012 | Maltz | |
| 8,160,080 B1 | 4/2012 | Arad | |
| 8,170,038 B2 | 5/2012 | Belanger | |
| 8,194,674 B1 | 6/2012 | Pagel | |
| 8,195,774 B2 | 6/2012 | Lambeth | |
| 8,204,061 B1 | 6/2012 | Sane | |
| 8,213,313 B1 | 7/2012 | Doiron | |
| 8,213,336 B2 | 7/2012 | Smith | |
| 8,230,069 B2 | 7/2012 | Korupolu | |
| 8,239,960 B2 | 8/2012 | Frattura | |
| 8,249,069 B2 | 8/2012 | Raman | |
| 8,270,401 B1 | 9/2012 | Barnes | |
| 8,295,291 B1 | 10/2012 | Ramanathan | |
| 8,295,921 B2 | 10/2012 | Wang | |
| 8,301,686 B1 | 10/2012 | Appajodu | |
| 8,339,994 B2 | 12/2012 | Gnanasekaran | |
| 8,351,352 B1 | 1/2013 | Eastlake, III | |
| 8,369,335 B2 | 2/2013 | Jha | |
| 8,369,347 B2 | 2/2013 | Xiong | |
| 8,392,496 B2 | 3/2013 | Linden | |
| 8,462,774 B2 | 6/2013 | Page | |
| 8,467,375 B2 | 6/2013 | Blair | |
| 8,520,595 B2 | 8/2013 | Yadav | |
| 8,599,850 B2 | 12/2013 | Jha | |
| 8,599,864 B2 | 12/2013 | Chung | |
| 8,615,008 B2 | 12/2013 | Natarajan | |
| 8,826,385 B2 | 9/2014 | Congdon | |
| 2001/0055274 A1 | 12/2001 | Hegge | |
| 2002/0019904 A1 | 2/2002 | Katz | |
| 2002/0021701 A1 | 2/2002 | Lavian | |
| 2002/0091795 A1 | 7/2002 | Yip | |
| 2003/0041085 A1 | 2/2003 | Sato | |
| 2003/0123393 A1 | 7/2003 | Feuerstraeter | |
| 2003/0174706 A1 | 9/2003 | Shankar | |
| 2003/0189905 A1 | 10/2003 | Lee | |
| 2004/0001433 A1 | 1/2004 | Gram | |
| 2004/0010600 A1 | 1/2004 | Baldwin | |
| 2004/0049699 A1 | 3/2004 | Griffith | |
| 2004/0117508 A1 | 6/2004 | Shimizu | |
| 2004/0120326 A1 | 6/2004 | Yoon | |
| 2004/0156313 A1 | 8/2004 | Hofmeister et al. | |
| 2004/0165595 A1 | 8/2004 | Holmgren | |
| 2004/0165596 A1 | 8/2004 | Garcia | |
| 2004/0213232 A1 | 10/2004 | Regan | |
| 2005/0007951 A1 | 1/2005 | Lapuh | |
| 2005/0044199 A1 | 2/2005 | Shiga | |
| 2005/0074001 A1 | 4/2005 | Mattes | |
| 2005/0094568 A1 | 5/2005 | Judd | |
| 2005/0094630 A1 | 5/2005 | Valdevit | |
| 2005/0122979 A1 | 6/2005 | Gross | |
| 2005/0157645 A1 | 7/2005 | Rabie et al. | |
| 2005/0157751 A1 | 7/2005 | Rabie | |
| 2005/0169188 A1 | 8/2005 | Cometto | |
| 2005/0195813 A1 | 9/2005 | Ambe | |
| 2005/0213561 A1 | 9/2005 | Yao | |
| 2005/0220096 A1 | 10/2005 | Friskney | |
| 2005/0265356 A1 | 12/2005 | Kawarai | |
| 2005/0278565 A1 | 12/2005 | Frattura | |
| 2006/0007869 A1 | 1/2006 | Hirota | |
| 2006/0018302 A1 | 1/2006 | Ivaldi | |
| 2006/0023707 A1 | 2/2006 | Makishima et al. | |
| 2006/0034292 A1 | 2/2006 | Wakayama | |
| 2006/0059163 A1 | 3/2006 | Frattura | |
| 2006/0062187 A1 | 3/2006 | Rune | |
| 2006/0072550 A1 | 4/2006 | Davis | |
| 2006/0083254 A1 | 4/2006 | Ge | |
| 2006/0098589 A1 | 5/2006 | Kreeger | |
| 2006/0168109 A1 | 7/2006 | Warmenhoven | |
| 2006/0184937 A1 | 8/2006 | Abels | |
| 2006/0221960 A1 | 10/2006 | Borgione | |
| 2006/0235995 A1 | 10/2006 | Bhatia | |
| 2006/0242311 A1 | 10/2006 | Mai | |
| 2006/0245439 A1 | 11/2006 | Sajassi | |
| 2006/0251067 A1 | 11/2006 | Desanti | |
| 2006/0256767 A1 | 11/2006 | Suzuki | |
| 2006/0265515 A1 | 11/2006 | Shiga | |
| 2006/0285499 A1 | 12/2006 | Tzeng | |
| 2006/0291388 A1 | 12/2006 | Amdahl | |
| 2007/0036178 A1 | 2/2007 | Hares | |
| 2007/0086362 A1 | 4/2007 | Kato | |
| 2007/0094464 A1 | 4/2007 | Sharma | |
| 2007/0097968 A1 | 5/2007 | Du | |
| 2007/0116224 A1 | 5/2007 | Burke | |
| 2007/0156659 A1 | 7/2007 | Lim | |
| 2007/0177525 A1 | 8/2007 | Wijnands | |
| 2007/0177597 A1 | 8/2007 | Ju | |
| 2007/0183313 A1 | 8/2007 | Narayanan | |
| 2007/0211712 A1 | 9/2007 | Fitch | |
| 2007/0274234 A1 | 11/2007 | Kubota | |
| 2007/0289017 A1 | 12/2007 | Copeland, III | |

(56) References Cited

U.S. PATENT DOCUMENTS

| | | |
|---|---|---|
| 2008/0052487 A1 | 2/2008 | Akahane |
| 2008/0065760 A1 | 3/2008 | Damm |
| 2008/0080517 A1 | 4/2008 | Roy |
| 2008/0101386 A1 | 5/2008 | Gray |
| 2008/0112400 A1 | 5/2008 | Dunbar et al. |
| 2008/0133760 A1 | 6/2008 | Berkvens et al. |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | Lavigne |
| 2008/0285555 A1 | 11/2008 | Ogasahara |
| 2008/0298248 A1 | 12/2008 | Roeck |
| 2008/0310342 A1 | 12/2008 | Kruys |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1* | 3/2009 | Fries ................ B61L 27/0088 340/539.22 |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0129384 A1 | 5/2009 | Regan |
| 2009/0138577 A1 | 5/2009 | Casado |
| 2009/0138752 A1 | 5/2009 | Graham |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0245137 A1 | 10/2009 | Hares |
| 2009/0245242 A1 | 10/2009 | Carlson |
| 2009/0246137 A1 | 10/2009 | Hadida |
| 2009/0252049 A1 | 10/2009 | Ludwig |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323708 A1 | 12/2009 | Ihle |
| 2009/0327392 A1 | 12/2009 | Tripathi |
| 2009/0327462 A1 | 12/2009 | Adams |
| 2009/0328392 | 12/2009 | Tripathi |
| 2010/0027420 A1 | 2/2010 | Smith |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0215049 A1* | 8/2010 | Raza ................ H01R 13/6658 370/401 |
| 2010/0220724 A1 | 9/2010 | Rabie |
| 2010/0226368 A1 | 9/2010 | Mack-Crane |
| 2010/0226381 A1* | 9/2010 | Mehta ................ H04L 12/465 370/401 |
| 2010/0246388 A1 | 9/2010 | Gupta |
| 2010/0257263 A1 | 10/2010 | Casado |
| 2010/0271960 A1 | 10/2010 | Krygowski |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0055274 A1 | 3/2011 | Scales et al. |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe |
| 2011/0142062 A1 | 6/2011 | Wang |
| 2011/0161494 A1 | 6/2011 | McDysan |
| 2011/0161695 A1 | 6/2011 | Okita |
| 2011/0188373 A1 | 8/2011 | Saito |
| 2011/0194403 A1* | 8/2011 | Sajassi ................ H04L 12/462 370/217 |
| 2011/0194563 A1 | 8/2011 | Shen |
| 2011/0228780 A1* | 9/2011 | Ashwood-Smith . H04L 12/4641 370/392 |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0273988 A1 | 11/2011 | Tourrilhes |
| 2011/0274114 A1 | 11/2011 | Dhar |
| 2011/0280572 A1 | 11/2011 | Vobbilisetty |
| 2011/0286457 A1 | 11/2011 | Ee |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1* | 1/2012 | Salam ................ H04L 43/10 370/242 |
| 2012/0014387 A1* | 1/2012 | Dunbar ............ H04L 12/4625 370/395.53 |
| 2012/0020220 A1 | 1/2012 | Sugita |
| 2012/0027017 A1 | 2/2012 | Rai |
| 2012/0033663 A1 | 2/2012 | Guichard |

(56) References Cited

U.S. PATENT DOCUMENTS

| | | | |
|---|---|---|---|
| 2012/0033665 A1 | 2/2012 | Da Silva |
| 2012/0033669 A1 | 2/2012 | Mohandas |
| 2012/0075991 A1 | 3/2012 | Sugita |
| 2012/0099602 A1 | 4/2012 | Nagapudi |
| 2012/0106339 A1 | 5/2012 | Mishra |
| 2012/0131097 A1 | 5/2012 | Baykal |
| 2012/0131289 A1 | 5/2012 | Taguchi |
| 2012/0158997 A1 | 6/2012 | Hsu |
| 2012/0163164 A1 | 6/2012 | Terry |
| 2012/0177039 A1 | 7/2012 | Berman |
| 2012/0243539 A1 | 9/2012 | Keesara |
| 2012/0275347 A1 | 11/2012 | Banerjee |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003737 A1 | 1/2013 | Sinicrope |
| 2013/0028072 A1 | 1/2013 | Addanki |
| 2013/0034015 A1 | 2/2013 | Jaiswal |
| 2013/0067466 A1 | 3/2013 | Combs |
| 2013/0070762 A1 | 3/2013 | Adams |
| 2013/0114595 A1 | 5/2013 | Mack-Crane et al. |
| 2013/0127848 A1 | 5/2013 | Joshi |
| 2013/0194914 A1 | 8/2013 | Agarwal |
| 2013/0219473 A1 | 8/2013 | Schaefer |
| 2013/0250951 A1 | 9/2013 | Koganti |
| 2013/0259037 A1 | 10/2013 | Natarajan |
| 2013/0272135 A1 | 10/2013 | Leong |
| 2014/0105034 A1 | 4/2014 | Sun |

FOREIGN PATENT DOCUMENTS

| | | |
|---|---|---|
| EP | 1398920 A2 | 3/2004 |
| EP | 2001167 A1 | 8/2007 |
| EP | 1916807 A2 | 10/2007 |
| EP | 1916807 A2 | 4/2008 |
| EP | 2001167 A1 | 12/2008 |
| WO | 2009042919 | 4/2009 |
| WO | 2010111142 A1 | 9/2010 |
| WO | 2014031781 | 2/2014 |

OTHER PUBLICATIONS

Knight, S. et al. "Virtual Router Redundancy Protocol", Apr. 1998, XP-002135272.
Eastlake, Donald et al., "RBridges: TRILL Header Options", Dec. 2009.
Touch, J. et al., "Transparent Interconnection of Lots of Links (TRILL): Problem and Applicability Statement", May 2009.
Perlman, Radia et al., "RBridge VLAN Mapping", Dec. 2009.
"Brocade Fabric OS (FOS) 6.2 Virtual Fabrics Feature Frequently Asked Questions".
Perlman, Radia "Challenges and Opportunities in the Design of TRILL: a Routed layer 2 Technology", XP-002649647, 2009.
Nadas, S. et al., "Virtual Router Redundancy Protocol (VRRP) Version 3 for IPv4 and IPv6", Mar. 2010.
Perlman, Radia et al., "RBridges: Base Protocol Specification", Mar. 2010.
Christensen, M. et al., "Considerations for Internet Group Management Protocol (IGMP) and Multicast Listener Discovery (MLD) Snooping Switches", May 2006.
"Switched Virtual Internetworking moved beyond bridges and routers", 8178 Data Communications Sep. 23, 1994, No. 12, New York.
S. Night et al., "Virtual Router Redundancy Protocol", Network Working Group, XP-002135272, Apr. 1998.
Eastlake 3rd., Donald et al., "RBridges: TRILL Header Options", Draft-ietf-trill-rbridge-options-00.txt, Dec. 24, 2009.
J. Touch, et al., "Transparent Interconnection of Lots of Links (TRILL): Problem and Applicability Statement", May 2009.
Perlman, Radia et al., "RBridge VLAN Mapping", Draft-ietf-trill-rbridge-vlan-mapping-01.txt, Dec. 4, 2009.
Brocade Fabric OS (FOS) 6.2 Virtual Fabrics Feature Frequently Asked Questions.
Perlman, Radia et al., "RBridges: Base Protocol Specification", draft-ietf-trill-rbridge-protocol-16.txt, Mar. 3, 2010.
Lapuh, Roger et al., "Split Multi-link Trunking (SMLT)", Oct. 2002.
Lapuh, Roger et al., "Split Multi-link Trunking (SMLT) draft-lapuh-network-smlt-08", 2008.
Huang, Nen-Fu et al. "An Effective Spanning Tree Algorithm for a Bridged LAN", Mar. 16, 1992.
Zhai, H. et al., "RBridge: Pseudo-Nickname draft-hu-trill-pseudonode-nickname-02.", May 15, 2012.
Narten, T. et al. "Problem Statement: Overlays for Network Virtualization draft-narten-nvo3-overlay-problem-statement-01", Oct. 31, 2011.
Knight, Paul et al. "Layer 2 and 3 Virtual Private Networks: Taxonomy, Technology, and Standardization Efforts", 2004.
An Introduction to Brocade VCS Fabric Technology, Dec. 3, 2012.
Kreeger, L. et al. "Network Virtualization Overlay Control Protocol Requirements draft-kreeger-nvo3-overlay-cp-00", Aug. 2, 2012.
Knight, Paul et al., "Network based IP VPN Architecture using Virtual Routers", May 2003.
Louati, Wajdi et al., "Network-Based Virtual Personal Overlay Networks Using Programmable Virtual Routers", 2005.
Brocade Unveils "The Effortless Network", 2009.
The Effortless Network: HyperEdge Technology for the Campus LAN, 2012.
Foundary FastIron Configuration Guide, Software Release FSX 04.2.00b, Software Release FWS 04.3.00, Software Release FGS 05.0.00a, 2008.
FastIron and Turbulron 24x Configuration Guide, 2010.
FastIron Configuration Guide, Supporting IronWare Software Release 07.0.00, 2009.
Christensen, M. et al., Considerations for Internet Group Management Protocol (IGMP) and Multicast Listener Discovery (MLD) Snooping Switches, 2006.
Perlman, Radia et al. "RBridges: Base Protocol Specification", <draft-ietf-trill-rbridge-protocol-16.txt>, 2010.
Brocade Fabric OS (FOS) 6.2 Virtual Fabrics Feature Frequently Asked Questions, 2009.
Eastlake III, Donald et al., "RBridges: TRILL Header Options", 2009.
Perlman, Radia "Challenges and Opportunities in the Design of TRILL: a Routed layer 2 Technology", 2009.
Perlman, Radia et al., "RBridge VLAN Mapping", <draft-ietf-trill-rbridge-vlan-mapping-01.txt>, 2009.
Knight, S. et al., "Virtual Router Redundancy Protocol", 1998.
"Switched Virtual Internetworking moves beyond bridges and routers", 8178 Data Communications Sep. 23, 1994, No. 12.
Touch, J. et al., "Transparent Interconnection of Lots of Links (TRILL): Problem and Applicability Statement", 2009.
Lapuh, Roger et al., "Split Multi-link Trunking (SMLT)", 2002.
Lapuh, Roger et al., "Split Multi-Link Trunking (SMLT) draft-Lapuh-network-smlt-08", 2009.
Nadas, S. et al., "Virtual Router Redundancy Protocol (VRRP) Version 3 for IPv4 and IPv6", 2010.
Office action dated Sep. 12, 2012, U.S. Appl. No. 12/725,249, filed Mar. 16, 2010.
Office action dated Apr. 26, 2012, U.S. Appl. No. 12/725,249, filed Mar. 16, 2010.
Office action dated Dec. 5, 2012, U.S. Appl. No. 13/087,239, filed Apr. 14, 2011.
Office action dated May 22, 2013, U.S. Appl. No. 13/087,239, filed Apr. 14, 2011.
Office action dated Dec. 21, 2012, U.S. Appl. No. 13/098,490, filed May 2, 2011.
Office action dated Jul. 9, 2013, U.S. Appl. No. 13/098,490, filed May 2, 2011.
Office action dated Mar. 27, 2014, U.S. Appl. No. 13/098,490, filed May 2, 2011.
Office action dated Feb. 5, 2013, U.S. Appl. No. 13/092,724, filed Apr. 22, 2011.
Office action dated Jul. 16, 2013, U.S. Appl. No. 13/092,724, filed Jul. 16, 2013.
Office action dated Jun. 10, 2013, U.S. Appl. No. 13/092,580, filed Apr. 22, 2011.
Office action dated Jan. 10, 2014, U.S. Appl. No. 13/092,580, filed Apr. 22, 2011.

(56) References Cited

OTHER PUBLICATIONS

Office action dated Mar. 18, 2013, U.S. Appl. No. 13/042,259, filed Mar. 7, 2011.
Office action dated Jan. 16, 2014, U.S. Appl. No. 13/042,259, filed Mar. 7, 2011.
Office action dated Jul. 31, 2013, U.S. Appl. No. 13/042,259, filed Mar. 7, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.
Office action dated Feb. 5, 2013, U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Mar. 4, 2013, U.S. Appl. No. 13/092,877, filed Apr. 22, 2011.
Office action dated Sep. 5, 2013, U.S. Appl. No. 13/092,877, filed Apr. 22, 2011.
Office action dated Jan. 6, 2014, U.S. Appl. No. 13/092,877, filed Apr. 22, 2011.
Office action dated Jun. 20, 2014, U.S. Appl. No. 13/092,877, filed Apr. 22, 2011.
Office action dated Jun. 7, 2012, U.S. Appl. No. 12/950,968, filed Nov. 19, 2010.
Office action dated Jan. 4, 2013, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Oct. 2, 2013, U.S. Appl. No. 13/044,326, filed Mar. 9, 2011.
Office action dated Dec. 3, 2012, U.S. Appl. No. 13/030,806, filed Feb. 18, 2011.
Office action dated Jun. 11, 2013, U.S. Appl. No. 13/030,806, filed Feb. 18, 2011.
Office action dated Apr. 22, 2014, U.S. Appl. No. 13/030,806, filed Feb. 18, 2011.
Office action dated Apr. 25, 2013, U.S. Appl. No. 13/030,688, filed Feb. 18, 2011.
Office action dated Jun. 11, 2013, U.S. Appl. No. 13/044,301, filed Mar. 9, 2011.
Office action dated Feb. 22, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Dec. 2, 2013, U.S. Appl. No. 13/184,526, filed Jul. 16, 2011.
Office action dated Jun. 19, 2013, U.S. Appl. No. 13/092,873, filed Apr. 22, 2011.
Office action dated Nov. 29, 2013, U.S. Appl. No. 13/092,873, filed Apr. 22, 2011.
Office action dated Jul. 23, 2013, U.S. Appl. No. 13/365,993, filed Feb. 3, 2012.
Office action dated Jul. 18, 2013, U.S. Appl. No. 13/365,808, filed Feb. 3, 2012.
Office action dated Mar. 6, 2014, U.S. Appl. No. 13/425,238, filed Mar. 20, 2012.
Office action dated Jun. 13, 2013, U.S. Appl. No. 13/312,903, filed Dec. 6, 2011.
Office action dated Nov. 12, 2013, U.S. Appl. No. 13/312,903, filed Dec. 6, 2011.
Office action dated Jun. 18, 2014, U.S. Appl. No. 13/440,861, filed Apr. 5, 2012.
Office action dated Feb. 28, 2014, U.S. Appl. No. 13/351,513, filed Jan. 17, 2012.
Office action dated May 9, 2014, U.S. Appl. No. 13/484,072, filed May 30, 2012.
Office action dated Oct. 21, 2013, U.S. Appl. No. 13/533,843, filed Jun. 26, 2012.
Office action dated May 14, 2014, U.S. Appl. No. 13/533,843, filed Jun. 26, 2012.
Office action dated Feb. 20, 2014, U.S. Appl. No. 13/598,204, filed Aug. 29, 2012.
Office action dated Jun. 6, 2014, U.S. Appl. No. 13/669,357, filed Nov. 5, 2012.
Office Action dated Jun. 18, 215, U.S. Appl. No. 13/098,490, filed May 2, 2011.
Office Action dated Jun. 16, 2015, U.S. Appl. No. 13/048,817, filed Mar. 15, 2011.
Office Action dated Mar. 14, 2014, U.S. Appl. No. 13/092,460, filed Apr. 22, 2011.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.

(56) References Cited

OTHER PUBLICATIONS

Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/598,204, filed Aug. 29, 2012, dated Feb. 20, 2014.
Office Action dated Apr. 9, 2014, U.S. Appl. No. 13/092,724, filed Apr. 22, 2011.
Office Action dated Mar. 26, 2014, U.S. Appl. No. 13/092,701, filed Apr. 22, 2011.
Office Action dated Apr. 9, 2014, U.S. Appl. No. 13/092,752, filed Apr. 22, 2011.
Office Action for U.S. Appl. No. 13/098,490, filed May 2, 2011, dated Mar. 27, 2014.
'An Introduction to Brocade VCS Fabric Technology', Brocade white paper, http://community.brocade.com/docs/DOC-2954, Dec. 3, 2012.
U.S. Appl. No. 13/030,806 Office Action dated Dec. 3, 2012.
Brocade 'Brocade Unveils' The Effortless Network, http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Office Action for U.S. Appl. No. 13/365,808, filed Jul. 18, 2013, dated Jul. 18, 2013.
Office Action for U.S. Appl. No. 13/092,887, dated Jan. 6, 2014.
Office action dated Aug. 4, 2014, U.S. Appl. No. 13/050,102, filed Mar. 17, 2011.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 13/087,239, filed Apr. 14, 2011, dated Dec. 5, 2012.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009, pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/786,328, filed Mar. 5, 2013, dated Mar. 13, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Rosen, E. et al., "BGP/MPLS VPNs", Mar. 1999.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action for U.S. Appl. No. 13/425,238, filed Mar. 20, 2012, dated Mar. 12, 2015.
Office Action for U.S. Appl. No. 14/577,785, filed Dec. 19, 2014, dated Apr. 13, 2015.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.

* cited by examiner

SCALABLE MAC ADDRESS DISTRIBUTION IN AN ETHERNET FABRIC SWITCH

RELATED APPLICATIONS

This application claims the benefit of U.S. Provisional Application No. 61/502,128, titled "Scalable MAC Address Distribution in VCS," by inventors Mythilikanth Raman and Mary Manohar, filed 28 Jun. 2011, the disclosure of which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, the disclosure of which is incorporated by reference herein.

BACKGROUND

1. Field

The present disclosure relates to network management. More specifically, the present disclosure relates to a method and system for efficiently distributing and storing network forwarding information.

2. Related Art

The growth of the Internet has brought with it an increasing demand for bandwidth. As a result, equipment vendors race to build larger and faster switches, each capable of supporting a large number of end devices, to move more traffic efficiently. However, the size of a switch cannot grow infinitely. It is limited by physical space, power consumption, and design complexity, to name a few factors. One way to meet this challenge is to interconnect a number of switches to support a large number of users. These interconnected switches can distribute forwarding information among them and store the distributed information in local forwarding tables. However, forwarding tables in such switches can grow substantially with an increasing number of forwarding entries for local and remote end devices. Furthermore, distribution of forwarding information across these switches may become complex and can incur high latency. More importantly, an overly large and complex system often does not provide economy of scale, and distributing and updating information in forwarding tables may become unviable due to the increased complexity.

As layer-2 (e.g., Ethernet) switching technologies continue to evolve, more routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

While TRILL brings many desirable features to layer-2 networks, some issues remain unsolved when efficient distribution and updating of forwarding information is desired for forwarding tables.

SUMMARY

One embodiment of the present invention provides a switch. The switch includes a notification mechanism. The notification mechanism constructs a single message that contains a locally learned media access control (MAC) address associated with a local device, a TRILL RBridge identifier associated with the switch, and an identifier of an interface associated with the MAC address.

In a variation on this embodiment, the message is constructed in a type-length-value (TLV) format.

In a variation on this embodiment, the message also contains an instruction to add, delete, or modify the MAC address.

In a variation on this embodiment, the message also contains a virtual local area network (VLAN) tag and a type indicator associated with the MAC address.

In a variation on this embodiment, the notification mechanism constructs a second message that contains an instruction to remove a MAC address associated with one or more of the following: 1) the interface identifier; 2) a VLAN tag; 3) the RBridge identifier; 4) any entry.

One embodiment of the present invention provides a switch. The switch includes a data structure and an entry management mechanism. The data structure stores device information learned at a remote switch, wherein the device information includes a MAC address of a device, a TRILL RBridge identifier associated with the remote switch, an identifier of an interface coupled to the device, and a type indicator of the MAC address. The entry management mechanism manages an entry in the data structure based on the RBridge identifier and the interface identifier.

In a variation on this embodiment, the data structure also contains a VLAN tag associated with the MAC address.

In a variation on this embodiment, the entry management mechanism constructs a second message that contains an instruction to remove a MAC address associated with one or more of the following: 1) the interface identifier; 2) a VLAN tag; 3) the RBridge identifier; and 4) any entry.

In a variation on this embodiment, the switch also includes a display mechanism that displays the entries in the data structure, wherein the displayed entries are the same in the switch and the remote switch.

In a variation on this embodiment, the switch also includes a logical switch management mechanism that maintains a membership in a logical switch, wherein the logical switch is configured to accommodate a plurality of switches and operates as a single logical switch.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of distributing forwarding information across a TRILL network is solved by distributing aggregated local forwarding information using type-length-value (TLV) messages that include local interface identifiers. An RBridge can share forwarding information with other RBridges in a TRILL network to maintain consistency across the network. Typically, forwarding information, such as MAC addresses of local end devices, is shared across the TRILL network using "add" or "delete" commands that adds or deletes a corresponding MAC address entry to a forwarding table, respectively. However, when the TRILL network scales to a large number of RBridges, and a respective RBridge learns a large number MAC addresses, using add or delete commands poses scalability issues. Under such a scenario, each of the large number of MAC addresses is distributed to each RBridge, and consequently, a large number of messages are passed across the network. Hence, packing of MAC addresses and other forwarding information in a TLV message reduces the number of update messages.

The TLV message from an RBridge aggregates forwarding information associated with one or more end devices, and includes information such as an RBridge identifier and an interface identifier of a local end device. Other RBridges in the TRILL network update their respective forwarding tables based on the received TLV message and can group forwarding information based on RBridge identifiers and interface identifiers. For a change in forwarding information (e.g., a flush operation) associated with a local interface, the local RBridge can send a single message with an identifier of the interface indicating the change. Upon receiving the message, other RBridges update their local forwarding table entries associated with that interface. This mechanism obviates the need to update each forwarding entry associated individual MAC addresses and can significantly reduce network overhead. In contrast, in a TRILL network without such efficient forwarding and storing mechanism, forwarding information for a respective end device is usually sent in individual messages, leading to a large number of notification messages. Furthermore, if the forwarding information does not include any interface identifier, any change associated with an interface (such as a flush of all MAC addresses on the interface) may lead to a large number of notification messages. If the number of notification messages is large, simply aggregating the messages may still not sufficiently scale. For example, in some networks, each change in a network interface may result in several thousand such messages.

In some embodiments of the present invention, an RBridge may learn about a large number of end devices from a local interface. The RBridge then efficiently aggregates the forwarding information associated with the end devices in a TLV message and sends the information to other RBridges in the TRILL network. The forwarding information for an end device includes the MAC address of the end device, an identifier of the RBridge, and an identifier of the interface to which the end device is coupled. The information may include a VLAN tag and a type indicator flag indicating the type of MAC address. In some embodiments, the type of a MAC address can be dynamic, static, or multicast. In some embodiments, the TRILL network is a fabric switch, such as an Ethernet fabric switch or a virtual cluster switch (VCS). In an Ethernet fabric switch, any number of RBridges coupled in an arbitrary topology may logically operate as a single switch. Any new RBridge may join or leave the fabric switch in "plug-and-play" mode without any manual configuration.

Whenever an RBridge learns about an end device from a TLV message, the RBridge stores the forwarding information in a local forwarding table. Each entry in the forwarding table corresponds to an end device (either local or remote) and includes a MAC address of the end device, an associated RBridge identifier, and an interface identifier. In some embodiments, the entry also includes a VLAN tag and a flag indicating the type of MAC address. During operation, if an interface on an RBridge becomes unavailable, all MAC addresses associated with the interface should be removed from all forwarding tables in all RBridges in the TRILL network. As all forwarding tables include interface information, the RBridge can simply issue a "flush" message to all other RBridges, indicating that all end devices associated with the unavailable interface should be flushes (i.e., removed) from entries associated with the interface. This flush message facilitates efficient updating of forwarding entries in remote RBridges in a TRILL network. In some embodiments, the forwarding information from a TLV message is stored in hierarchical forwarding tables, wherein each table stores a coherent subset of the forwarding information. Under such a scenario, each flush message may modify one table while leaving others unchanged.

Although the present disclosure is presented using examples based on the TRILL protocol, embodiments of the present invention are not limited to TRILL networks, or networks defined in a particular Open System Interconnection Reference Model (OSI reference model) layer.

The term "RBridge" refers to routing bridges, which are bridges implementing the TRILL protocol as described in IETF Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

In this disclosure, the terms "interface" and "port" are used interchangeably. The term "edge port" refers to an interface on an RBridge which sends/receives data frames in native Ethernet format. The term "TRILL port" refers to an interface which sends/receives data frames encapsulated with a TRILL header and outer MAC header.

The term "end device" refers to a network device that is typically not TRILL-capable. "End device" is a relative term with respect to the TRILL network. However, "end device" does not necessarily mean that the network device is an end host. An end device can be a host, a conventional layer-2 switch, or any other type of network device. Additionally, an end device can be coupled to other switches or hosts further away from the TRILL network. In other words, an end device can be an aggregation point for a number of network devices to enter the TRILL network.

The term "RBridge identifier" refers to a group of bits that can be used to identify an RBridge. Note that the TRILL standard uses "RBridge ID" to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "RBridge identifier" is used as a generic term and is not limited to any bit format, and can refer to "RBridge ID" or "RBridge nickname" or any other format that can identify an RBridge.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

In this disclosure, the term "forwarding information" is used in generic sense, and it can refer to any information that is associated with a forwarding decision in any layer in a network. The term "forwarding table" is used in generic sense, and it can refer to any data structure that contains forwarding information. "Forwarding table" can be replaced by other terminologies referring to a table containing forwarding information, such as "MAC address table" or "switch table."

In this disclosure, an Ethernet fabric switch or a VCS refers to a fabric switch that runs a control plane with automatic configuration capabilities. The automatic configuration capability allows a number of smaller physical switches to be inter-connected to form a single, scalable logical switch without requiring manual configuration. In a fabric switch, any number of switches can be connected in an arbitrary topology without requiring manual configuration of the ports and links. This feature makes it possible to use many smaller, inexpensive switches to construct a large fabric switch, which can be viewed as a single logical switch externally.

Network Architecture

Figure 1:
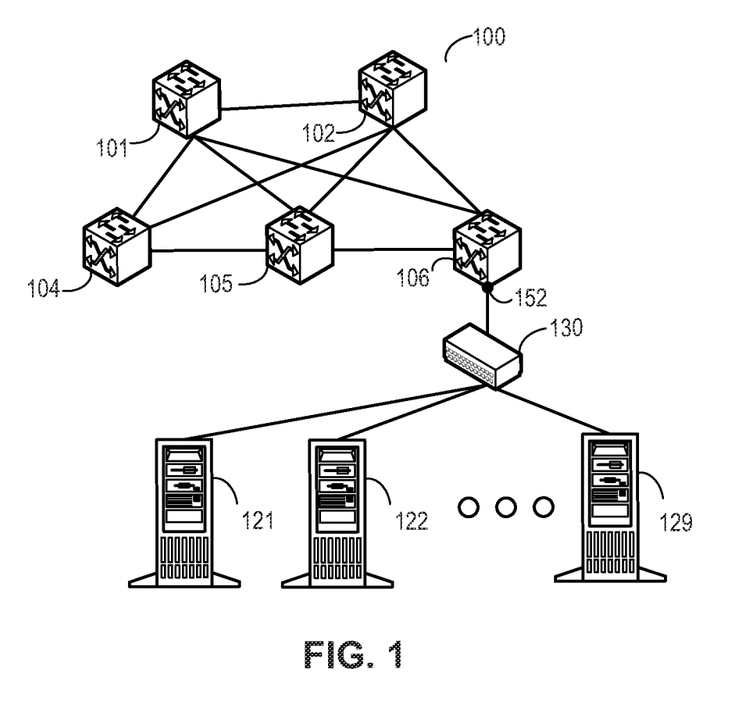
FIG. 1 illustrates an exemplary network that includes a large number of end devices coupled to an RBridge, in accordance with an embodiment of the present invention.

FIG. 1 illustrates an exemplary network that includes a large number of end devices coupled to an RBridge, in accordance with an embodiment of the present invention. As illustrated in FIG. 1, a TRILL network 100 includes RBridges 101, 102, 104, 105, and 106. A large number of end devices, from 121 to 129, are coupled to RBridge 106, via an aggregation node, a layer-2 bridge 130. RBridges in network 100 use edge ports to communicate with end devices and TRILL ports to communicate with other RBridges. For example, RBridge 106 is coupled to bridge 130 via an edge port and to RBridges 101, 102, and 105 via TRILL ports. In some embodiments, TRILL network 100 can be a virtual cluster switch (VCS).

During operation, RBridge 106 learns the MAC addresses of end devices 121 to 129 from interface 152. Consequently, RBridge 106 constructs a TLV message containing forwarding information of the end devices. TLV is explained later in this disclosure in conjunction with FIGS. 2A and 2B. For example, for end device 121, the TLV message contains the learned MAC address of end device 121, an identifier of RBridge 106, and an identifier of interface 152. The message may also include a VLAN tag associated with end device 121 and a flag indicating the MAC address type. In some embodiments, the MAC address type can be "static," "dynamic," or "multicast." The length field of the TLV message is the length of the message with all such forwarding information for end devices 121 to 129. The type field of the TLV message indicates the type of operation associated with the message. In some embodiments, the type field of the TLV message can be "add," "delete," and "modify." In this example, after learning the MAC addresses of end devices 121 to 129, RBridge 106 sets the type value as "add," indicating that other RBridges should add the forwarding information to their forwarding tables.

Upon receiving the TLV message, RBridge 102 checks the type of the message. Based on the type, RBridge 102 determines the type of operation on the received forwarding information from the message. In this example, RBridge 102 detects the type of the message to be "add," and determines that the forwarding information in the TLV message is for newly learned end devices. In some embodiments, RBridge 102 obtains the length of the message from the length field and determines the number of end devices associated with the message. RBridge 102 then creates an entry with forwarding information for each MAC address in the message. Similarly, all other RBridges in network 100 updates their respective forwarding tables with received forwarding information from the TLV messages. Each entry in a forwarding table is associated with an end device and includes the MAC address of the end device, an associated RBridge identifier, and an interface identifier. The entry can also include a VLAN tag and a MAC address type indicator. Similarly to the add operation, if the type field indicates "modify" or "delete," the corresponding operation is performed on a respective entry in the forwarding table for a respective MAC address in the message.

Furthermore, if interface 152 becomes unavailable (e.g., due to a failure), RBridge 106 notifies all other RBridges to flush all entries associated with interface 152. Because each forwarding table entry for end devices 121 to 129 is associated with both RBridge 106 and interface 152, a flush message from RBridge 106 with an identifier of interface 152 is sufficient for all other RBridges in network 100 to determine the entries to be flushed from their respective forwarding tables. For example, upon receiving the flush message, RBridge 104 inspects the entries associated with RBridge 106 and identifies the entries that are associated with interface 152. RBridge 104 then removes all identified entries from the local forwarding table. As a result, flush operations become efficient and the number of flush messages decreases.

During operation that does not involve using TLV messages for distributing forwarding information, an RBridge in a TRILL network may send forwarding information of each end device over individual messages. Under such a scenario, in FIG. 1, upon learning the MAC addresses of end devices 121 to 129, RBridge 106 sends individual notification message for each of the N end devices to all other RBridges. Similarly, if there is any change to the forwarding information of the end devices (e.g., a change in the VLAN settings), RBridge 106 sends individual messages for each end device. If the number of RBridges in TRILL network 100 and/or N is large, the number of such individual messages may not scale. As a result, forwarding information dispersion becomes inefficient and each change in the forwarding information may lead to a flood of messages in TRILL network 100.

During operation that does not involve storing interface information in forwarding tables, a flush message is issued for each end device associated with an interface containing the MAC address of the end device. Under such a scenario, the entries in the forwarding table of RBridge 104 do not include interface identifiers. If interface 152 becomes unavailable, RBridge 106 sends individual flush messages to RBridge 104 for end devices 121 to 129. Upon receiving the flush messages, RBridge 104 inspects local forwarding entries for the MAC address in each flush message and removes the corresponding entry. Consequently, the flush operation remains inefficient and the number of flush messages can become large.

Note that TRILL is only used as a transport between the switches within network 100. This is because TRILL can readily accommodate native Ethernet frames. Also, the TRILL standards provide a ready-to-use forwarding mechanism that can be used in any routed network with arbitrary topology. Embodiments of the present invention should not be limited to using only TRILL as the transport. Other protocols (such as Internet protocol (IP) or multi-protocol label switching (MPLS)), either public or proprietary, can also be used for the transport.

Forwarding Information Distribution

Figure 2A:
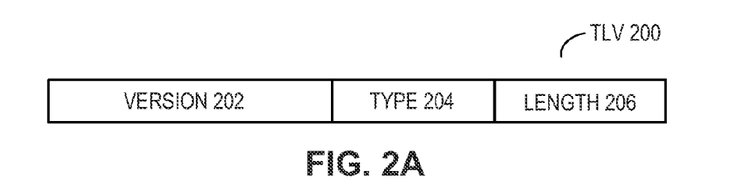
FIG. 2A illustrates exemplary TLV format fields, in accordance with an embodiment of the present invention.

In some embodiments, when an RBridge learns MAC addresses of local end devices, the RBridge packs the forwarding information of the end devices in a TLV message. FIG. 2A illustrates exemplary TLV format fields, in accordance with an embodiment of the present invention. TLV format 200 includes a version field 202, a type field 204, and a length field 206. In some embodiments, the length of version field 202 is 16 bits, type field 204 is 8 bits, and length field 204 is 8 bits, totaling 32 bits (4 bytes). Version field 202 indicates the version of the TLV message. For example, in one version, forwarding information of each end device in a TLV message does not include an interface identifier. Consequently, an RBridge packs and interprets forwarding information from the message accordingly. On the other hand, another version of the TLV message may include interface identifiers, and the RBridge packs and interprets forwarding information accordingly based on the version number.

Type field 204 indicates the type of operation associated with the message. For example, type field 204 may include values indicating addition, deletion, and modification operations. Length field 206 indicates the length of the message. In conjunction with version field 202, length field 206 can indicate the number of end devices associated with the TLV message (i.e., number of end devices for which the corresponding forwarding information is included in the TLV message). For example, according to version field 202, the forwarding information of an end device may require 16 bytes. If length field 206 indicates 160 bytes of data, then the message contains forwarding information for 10 end devices. In some embodiments, length field 206 may include 4 bytes of TLV format fields as well.

Figure 2B:
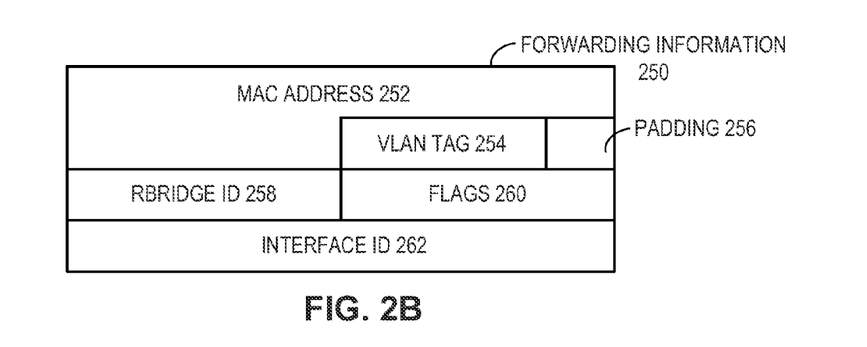
FIG. 2B illustrates exemplary forwarding information of an end device in a TLV message, in accordance with an embodiment of the present invention.

In a TLV message, the version field indicates the forwarding information of an end device included in a TLV message. FIG. 2B illustrates exemplary forwarding information of an end device in a TLV message, in accordance with an embodiment of the present invention. Forwarding information 250 of an end device includes MAC address 252 of the end device, a VLAN tag 254, an RBridge identifier 258, flags 260, and an interface identifier 262. VLAN tag 254 indicates the VLAN membership of the end device. Forwarding information 250 may also include padding 256 for alignment purposes. For example, if the length of VLAN tag 254 is 12 bits, then forwarding information 250 can include a padding 256 of 4 bits to ensure alignment with other fields. RBridge identifier 258 identifies the RBridge to which the end device is coupled. In some embodiments, RBridge identifier 258 is an RBridge nickname. Flags 260 indicate the MAC address type. The values for flags 260 can indicate whether the MAC address is a static, dynamic (e.g., dynamically learned from a port), or multicast address. Interface identifier 262 identifies an interface through which the end device couples to the RBridge.

Figure 3:
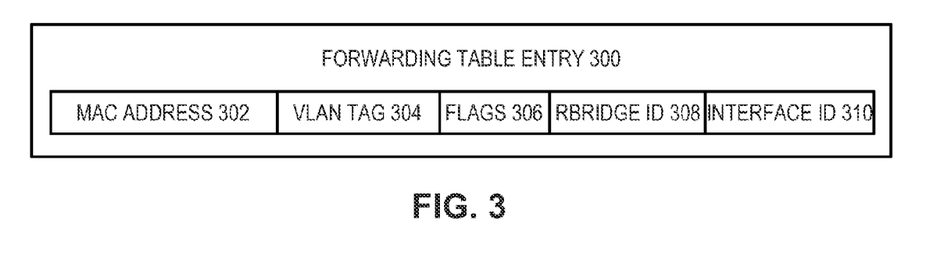
FIG. 3 illustrates an exemplary forwarding table entry, in accordance with an embodiment of the present invention.

Upon receiving a TLV message, an RBridge may add, delete, or modify entries to local forwarding tables with forwarding information received from the message. FIG. 3 illustrates an exemplary forwarding table entry, in accordance with an embodiment of the present invention. Forwarding table entry 300 stores forwarding information 250 of an end device, as described in conjunction with FIG. 2B. Entry 300 includes the MAC address 302 of the end device, a VLAN tag 304, flags 306, an RBridge identifier 308, and an interface identifier 310. Inclusion of interface identifier 310 allows all end devices coupled to the interface to be identified together. For example, in FIG. 1, end devices 121 to 129 are coupled to RBridge 106 though interface 152. In entry 300, identifiers to RBridge 106 and interface 152 together can correspond to end devices 121 to 129. If interface 152 becomes unavailable, RBridge 106 can notify other RBridges using identifiers to RBridge 106 and interface 152 without having to specify the MAC addresses of end devices 121 to 129. Upon receiving the notification, an RBridge removes each entry 300 that has an identifier of RBridge 106 and an identifier of interface 152. Hence, a change to an interface can be efficiently notified using identifiers to the corresponding RBridge and interface without having to specify the MAC addresses of the end devices coupled to the interface.

Forwarding Table Updates

Figure 4A:
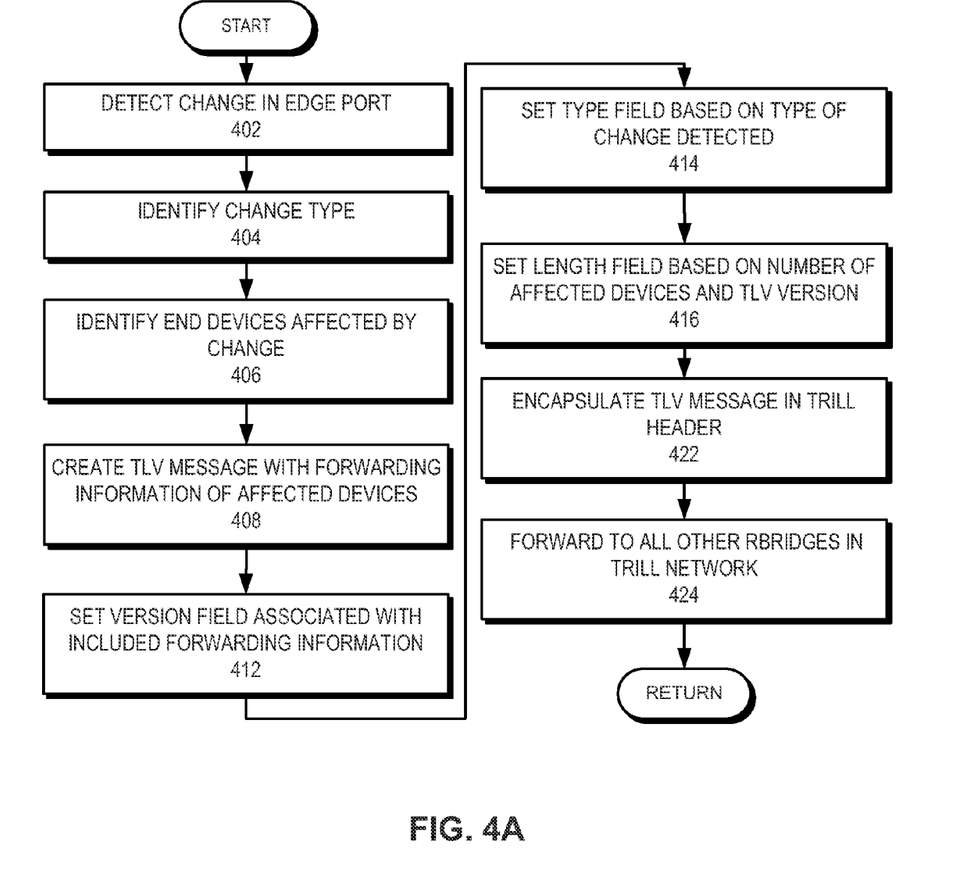
FIG. 4A presents a flowchart illustrating the process of an RBridge sending forwarding information associated with local end devices, in accordance with an embodiment of the present invention.

An RBridge can share forwarding information of local end devices with all other RBridges in a TRILL network, especially if the TRILL network is part of a fabric switch, such as a VCS. FIG. 4A presents a flowchart illustrating the process of an RBridge sending forwarding information associated with local end devices, in accordance with an embodiment of the present invention. Upon detecting a change in an edge port (operation 402), the RBridge first identifies the type of change (operation 404). In some embodiments, the change type can be "add", "delete", or "modify". The RBridge then identifies the end devices affected by the change (operation 406). For example, in FIG. 1, end devices 121 to 129 are affected by a change (addition) when RBridge 106 learns their MAC addresses. The RBridge then creates a TLV message with forwarding information of the identified devices (operation 408), as described in conjunction with FIG. 2B.

The RBridge sets the version field of the TLV message associated with the included forwarding information in the TLV message (operation 412), as described in conjunction with FIG. 2A. The RBridge then sets the type field of the TLV message based on the type of the detected change (operation 414) and sets the length field based on the number of affected devices and the value of the version field (operation 416), as described in conjunction with FIG. 2A. Then the RBridge encapsulates the TLV message in a TRILL header (operation 422) and forwards the message to other RBridges (operation 424). In some embodiments, the TLV message can be sent over multiple TRILL packets. In some embodiments, the message is sent in an internal message format of a fabric switch.

Figure 4B:
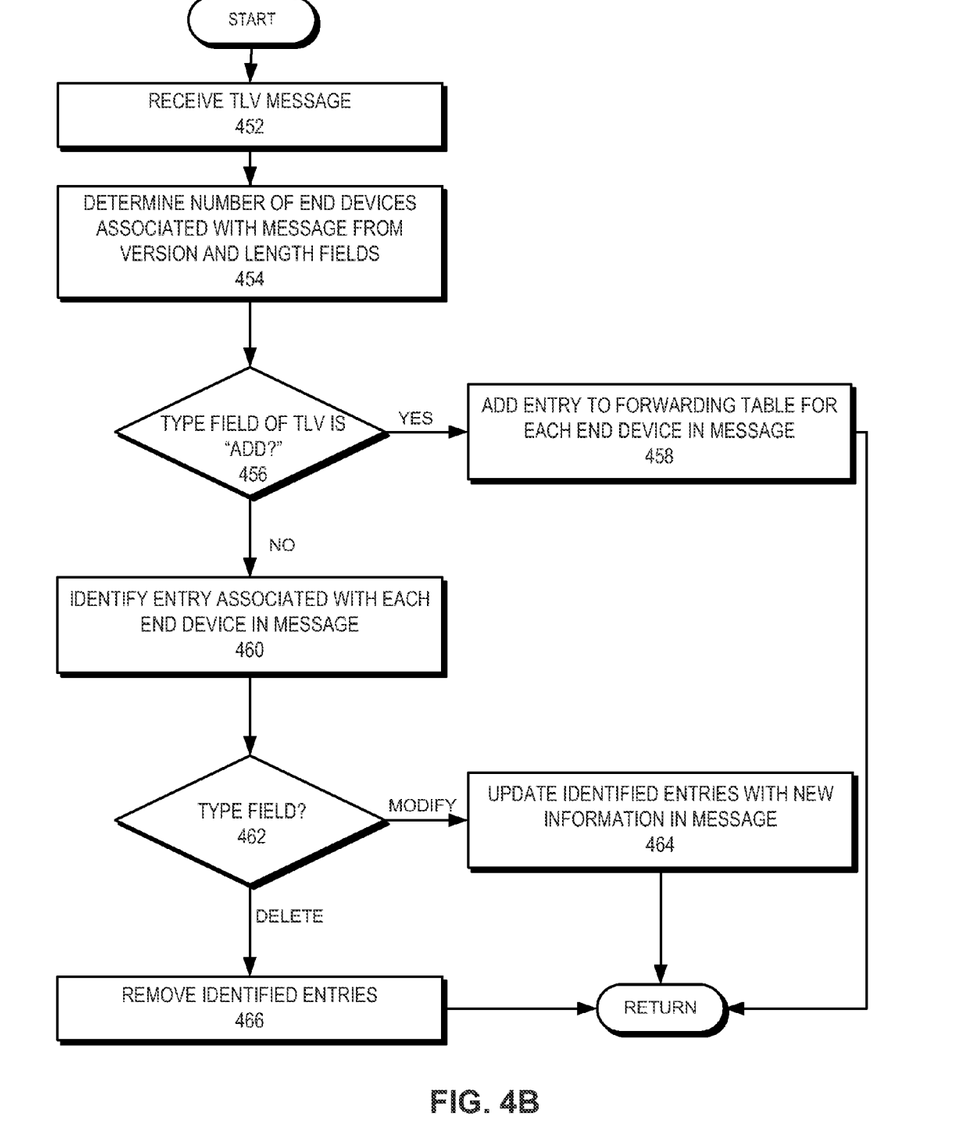
FIG. 4B presents a flowchart illustrating the process of an RBridge receiving forwarding information and updating a local forwarding table using the information, in accordance with an embodiment of the present invention.

FIG. 4B presents a flowchart illustrating the process of an RBridge receiving forwarding information and updating a local forwarding table using the information, in accordance with an embodiment of the present invention. Upon receiving a TLV message (operation 452), the RBridge determines the number of end devices (i.e., MAC addresses) associated with the message from the version and length fields (operation 454). The RBridge then checks the type field and determines whether the field is "add" (operation 456). If so, the RBridge adds an entry to a local forwarding table for each end device associated with the message (operation 458). In some embodiments, the RBridge adds entries to multiple hierarchical forwarding tables, wherein a respective entry contains coherent forwarding information.

If the entry is not "add," then the RBridge identifies a respective entry corresponding to a respective end device associated with the TLV message (operation 460) and determines the type field (operation 462). Note that the type field is checked for add separately (operation 456), because the addition operation does not require identifying current entries (operation 460). If the type field is "modify," then the identified entries are updated with forwarding information in the TLV message (operation 464). If the type field is "delete," then the identified entries are removed from the local forwarding table (operation 466). In some embodiments, the RBridge may remove or modify entries from one or more hierarchical forwarding tables, depending on the information in the TLV message.

Flush Operation

Flushing operations often cause RBridges in a TRILL network, particularly in a fabric switch, to use a large amount of internal processing. Such flushing operations can occur due to aging of entries and a network topology change. For example, assume there are a large number of forwarding entries associated with an interface on an RBridge. If the interface fails or the RBridge leaves the network (e.g., due to a failure), other RBridges should remove all associated entries from their respective forwarding tables. If an individual flush message is sent for each affected end device, the bandwidth on the control plane of the network is likely to be exhausted and may create a bottleneck. If a number of flush messages are bulked into a packet, a large number of such messages still may not scale. Hence, efficient flush operations and messaging are required for a scalable solution.

Figure 5A:
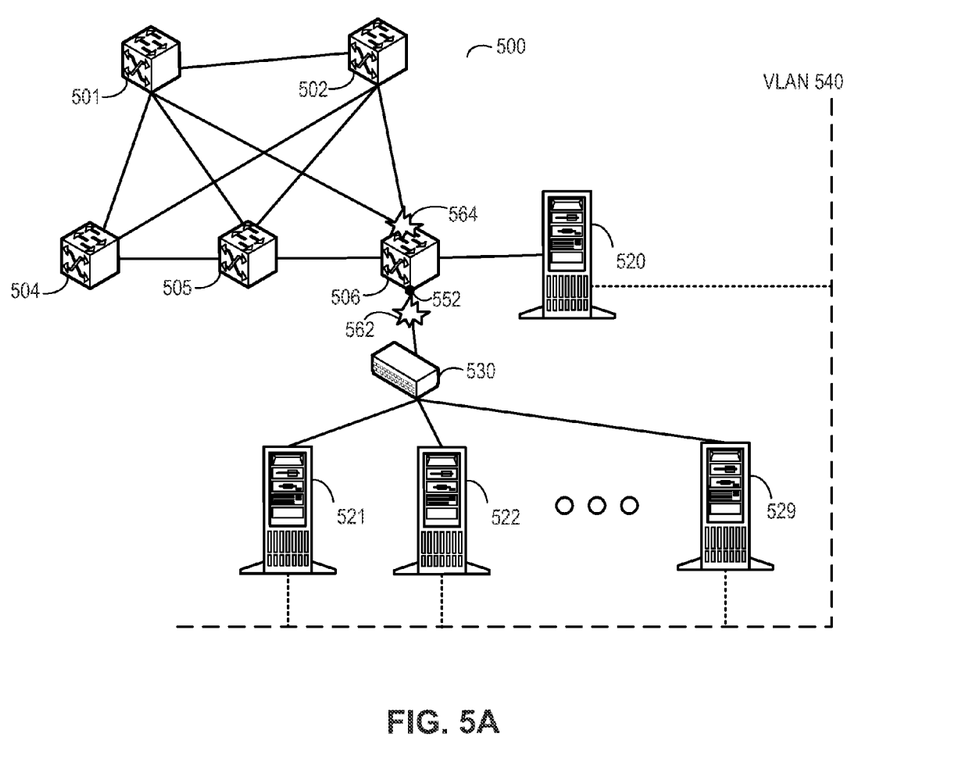
FIG. 5A illustrates a scenario where an RBridge associated with an end device experiences a failure, in accordance with an embodiment of the present invention.

FIG. 5A illustrates a scenario where an RBridge associated with an end device experiences a failure, in accordance with an embodiment of the present invention. In this example, a TRILL network 500 includes RBridges 501, 502, 504, 505, and 506. A layer-2 bridge 530 couples a large number of end devices from 521 to 529 to RBridge 506 via interface 552. End device 520 is coupled to RBridge 506 as well. End devices 521 to 529 and 520 are members of VLAN 540. During operation, RBridge 506 learns the MAC addresses of the end devices and sends the associated forwarding information to all other RBridges in network 500 in a TLV message, as described in conjunction with FIG. 4A. Other RBridges update their local forwarding tables based on the received forwarding information, as described in conjunction with FIG. 4B.

Suppose that failure 562 occurs that disconnects interface 552 from bridge 530. Failure 562 can occur due to a failure to interface 552 or to the link coupled to interface 552. As a result, interface 552 cannot receive packets for RBridge 506 any longer. However, end device 520 is still coupled to RBridge 506. Under such a scenario, all entries for end devices 521 to 529 in all forwarding tables in network 500 should be flushed. Consequently, RBridge 506 generates a flush message for interface 552 to all other RBridges in network 500 instead of generating an individual message for each end device. Upon receiving the flush message, each RBridge removes all entries associated with interface 552 on RBridge 506. In this way, the flush operation becomes efficient and the number of flush messages is reduced.

Suppose that failure 564 fails RBridge 506. As a result, all forwarding entries associated with RBridge 506 should be flushed. Neighboring RBridges, such as RBridges 501, 502, and 505, detect the failure, generate a flush message for RBridge 506, and send the message to other RBridges. Upon receiving the flush message, each RBridge, such as RBridge 504, removes all entries associated with RBridge 506. Similarly, a single flush message for VLAN 540 can be sent to all RBridges to remove all forwarding entries associated with VLAN 540. As a result, forwarding entries for end devices 521 to 529 and 520 are flushed from all forwarding tables in network 500.

Figure 5B:
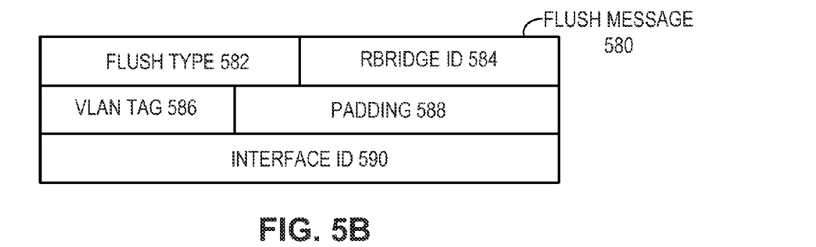
FIG. 5B illustrates an exemplary flush message, in accordance with an embodiment of the present invention.

FIG. 5B illustrates an exemplary flush message, in accordance with an embodiment of the present invention. In this example, flush message 580 includes flush type 582, an RBridge identifier 584, a VLAN tag 586, and interface identifier 590. Flush message 580 may also include padding 588 for alignment purposes. For example, if the length of VLAN tag 586 is 12 bits, message 580 can include a padding 588 of 20 bits to ensure alignment with other fields. Flush type 582 identifies the parameters on which the flush operation is executed. In some embodiments, the flush operation can be based on an interface, a VLAN, or an RBridge. Flush type 582 can also be based on a combination of interface and VLAN, or for all forwarding entries. RBridge identifier 584, VLAN tag 586, and interface identifier 590 provide identifying information for the flush operation. For example, if the flush type is based on an interface, then RBridge identifier 584 and interface identifier 590 are used to identify the corresponding forwarding entries. In some embodiments, the flush message is constructed using a TLV format.

Figure 6:
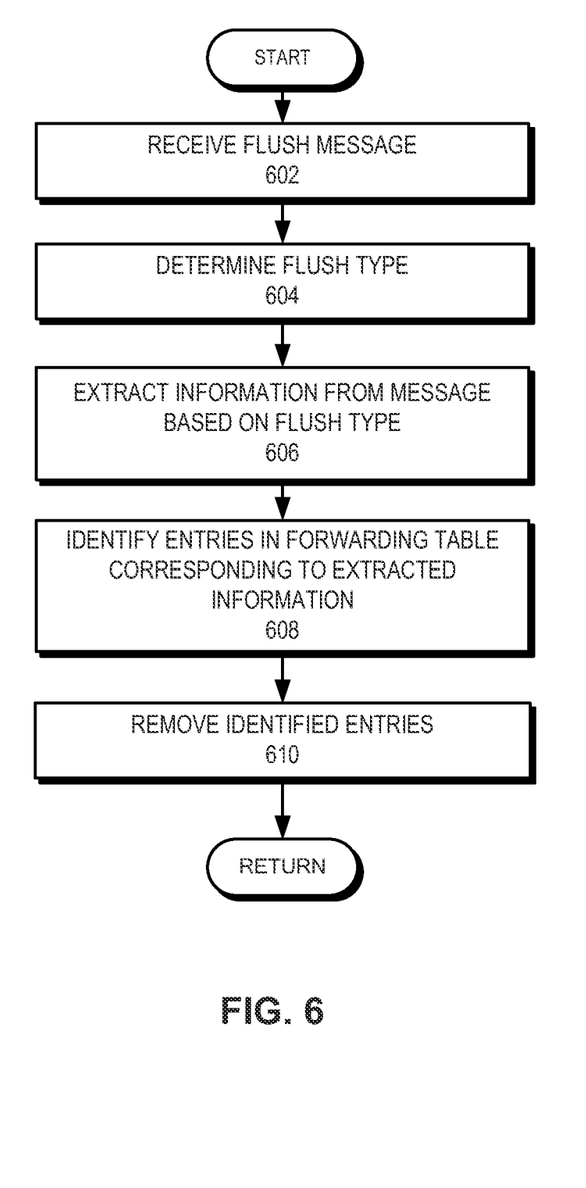
FIG. 6 presents a flowchart illustrating the process of an RBridge updating a local forwarding table based on a received flush message, in accordance with an embodiment of the present invention.

FIG. 6 presents a flowchart illustrating the process of an RBridge updating a local forwarding table based on a received flush message, in accordance with an embodiment of the present invention. Upon receiving a flush message (operation 602), the RBridge determines the type of flush message (operation 604). In some embodiments, the flush operation can be based on an interface, a VLAN, an RBridge, a combination of interface and VLAN, or for all forwarding entries. The RBridge then extracts information from the message based on the flush type (operation 606). The RBridge identifies the entries corresponding to extracted information in a local forwarding table (operation 608) and removes the identified entries from the forwarding table (operation 610). For example, in FIGS. 3 and 5B, if the flush operation is based on a VLAN tag, then the RBridge extracts VLAN tag 586 from flush message 580, identifies each forwarding entry 300 that has VLAN tag 304 equal to VLAN tag 586, and removes the entry from the forwarding table.

Displaying Forwarding Table

In some embodiments, an RBridge can be coupled to a display device. A user (e.g., a network administrator) may need to view the entries of the forwarding table. The user can issue a command to the RBridge to show the forwarding table. The command can be issued from a command line interface (CLI) of the RBridge or by using a Simple Network Management Protocol (SNMP) query.

In some embodiments, the RBridge can be a member switch of a fabric switch (e.g., an Ethernet fabric switch or a VCS). All member switches of the fabric switch operate in conjunction with each other as a single logical switch. Under such a scenario, the forwarding table in the RBridge contains forwarding information for all end devices coupled to the fabric switch. Because the forwarding table contains interface information associated with a respective end device, upon receiving a command to display the forwarding table, the RBridge can display all entries of the forwarding table as if all end devices were coupled to the logical switch. As a result, any end device coupled to any of the member switches appears as a local end device to the logical (i.e., fabric) switch. In other words, forwarding entries displayed at any member switch of the logical switch are similar, which is a desirable behavior from a fabric switch.

Exemplary Switch System

Figure 7:
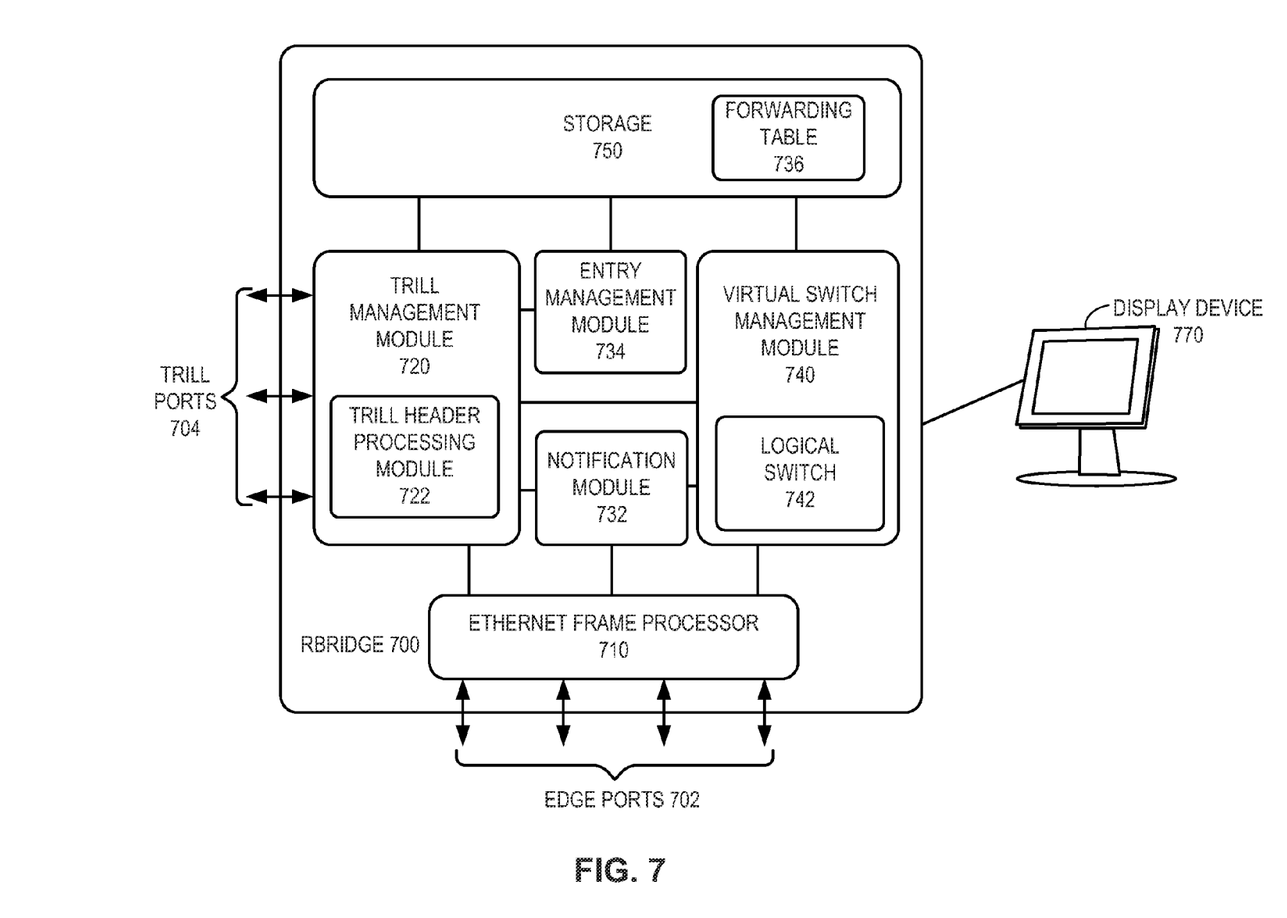
FIG. 7 illustrates an exemplary architecture of a switch, in accordance with an embodiment of the present invention.

FIG. 7 illustrates an exemplary architecture of a switch, in accordance with an embodiment of the present invention. In this example, an RBridge 700 includes a number of edge ports 702 and TRILL ports 704, a TRILL management module 720, an Ethernet frame processor 710, a notification module 732, and a storage 750. TRILL management module 720 further includes a TRILL header processing module 722. Edge ports 702 receive frames from (and transmit frames to) end devices. Ethernet frame processor 710 extracts and processes header information from the received frames. TRILL ports 704 include inter-switch communication channels for communication with one or more RBridges. This inter-switch communication channel can be implemented via a regular communication port and based on any open or proprietary format. Furthermore, the inter-switch communication between RBridges is not required to be direct port-to-port communication.

During operation, RBridge 700 learns about MAC addresses of local end devices from edge ports 702. Notification module 732 obtains the MAC addresses of Ethernet frame processor 710 and creates notification messages with the forwarding information. In some embodiments, the notification message is constructed as a TLV message. TRILL header processing module 722 encapsulates the message in a TRILL header and TRILL management module 720 sends the notification message to other RBridges in the network. Storage 750 contains identifying and routing information of other RBridges.

In some embodiments, RBridge 700 also includes an entry management module 734. When RBridge 700 receives notification messages from other RBridges from TRILL ports 704, TRILL header processing module 722 removes the TRILL header from the message and TRILL management module 720 provides entry management module 734 with the message. Entry management module 734 then stores the forwarding information in the message to forwarding table 736 in storage 750.

In some embodiments, RBridge 700 may maintain a membership in a logical switch, wherein RBridge 700 also includes a virtual switch management module 740 and a logical switch 742, as described in conjunction with FIG. 1. Virtual switch management module 740 maintains a configuration database in storage 750 that maintains the configuration state of every switch within the logical switch. Virtual switch management module 740 maintains the state of logical switch 742, which is used to join other switches. In some embodiments, logical switch 742 can be configured to operate in conjunction with Ethernet frame processor 710 as a logical Ethernet switch. In some embodiments, RBridge 700 can be coupled to a display device 770. Upon receiving a command to show the forwarding entries for logical switch 742, RBridge 700 displays all entries in forwarding table 736 via display device 770.

Note that the above-mentioned modules can be implemented in hardware as well as in software. In one embodiment, these modules can be embodied in computer-executable instructions stored in a memory which is coupled to one or more processors in RBridge 700. When executed, these instructions cause the processor(s) to perform the aforementioned functions.

In summary, embodiments of the present invention provide a switch, a method and a system for distributing forwarding information, including local interface identifiers, across a TRILL network using TLV messages and accordingly updating local forwarding tables. In one embodiment, the switch includes a notification mechanism. The notification mechanism constructs a single message that contains a locally learned MAC address associated with a local device, a TRILL RBridge identifier associated with the switch, and an identifier of an interface associated with the MAC address. In some embodiments, the switch includes a data structure and an entry management mechanism. The data structure stores device information learned at a remote switch, wherein the device information includes a MAC address of a device, a TRILL RBridge identifier associated with the remote switch, an identifier of an interface coupled to the device, and a type indicator of the MAC address. The entry management mechanism manages an entry in the data structure based on the RBridge identifier and the interface identifier.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
a notification module configured to construct a single message comprising forwarding information of a plurality of end devices learned from one or more local ports of the switch;
wherein the forwarding information of a respective end device of the plurality of end devices includes a media access control (MAC) address learned from a port of the one or more local ports, a switch identifier of the switch, which is distinct from the MAC address, and an identifier of the port from which the MAC address has been learned.

2. The switch of claim 1, wherein the message is constructed in a type-length-value (TLV) format.

3. The switch of claim 1, wherein the message further includes an instruction to add, delete, or modify the forwarding information.

4. The switch of claim 1, wherein the forwarding information of a respective end device of the plurality of end devices further includes a virtual local area network (VLAN) tag and a type indicator associated with the MAC address, wherein the type indicator indicates a type of the MAC address.

5. The switch of claim 1, wherein the notification module is further adapted to construct a second message that includes an instruction to remove one or more entries from the data structure based on one or more of:
the identifier of the port;
a VLAN tag;

the switch identifier; and
any entry.

6. A switch, comprising:
a storage device storing a data structure comprising an entry including a media access control (MAC) address of a remote end device, wherein the MAC address is learned at a port of a remote switch, and wherein the remote end device is distinct from the remote switch; and
wherein the entry further includes a switch identifier of the remote switch, an identifier of the port from which the remote switch has learned the MAC address, and a type indicator of the MAC address, wherein the type indicator indicates a type of the MAC address; and
an entry management module configured to manage the entry in the data structure -based on the switch identifier and the identifier of the port.

7. The switch of claim 6, wherein the entry further includes a virtual local area network (VLAN) tag associated with the MAC address.

8. The switch of claim 6, wherein the entry management module is further configured to remove one or more entries from the data structure based on one or more of:
the identifier of the port;
a VLAN tag;
the switch identifier; and
any entry.

9. The switch of claim 6, further comprising a display module adapted to display contents of a respective entry in the data structure via a display device.

10. The switch of claim 6, further comprising a logical switch management module adapted to maintain a membership in a network of interconnected switches, wherein a respective switch of the network is configured to store a copy of the data structure.

11. A computer-executable method, comprising:
constructing a single message comprising forwarding information of a plurality of end devices learned from one or more local ports of a switch;
wherein the forwarding information of a respective end device of the plurality of end devices includes a media access control (MAC) address learned from a port of the one or more local ports, a switch identifier of the switch, which is distinct from the MAC address, and an identifier of the port from which the MAC address has been learned.

12. The method of claim 11, wherein the message is constructed in a type-length-value (TLV) format.

13. The method of claim 11, wherein the message further includes an instruction to add, delete, or modify the forwarding information.

14. The method of claim 11, wherein the forwarding information of a respective end device of the plurality of end devices further includes a virtual local area network (VLAN) tag and a type indicator associated with the MAC address, wherein the type indicator indicates a type of the MAC address.

15. The method of claim 11, further comprising constructing a second message that includes an instruction to remove a-one or more entries from the data structure based on one or more of:
the identifier of the port;
a VLAN tag;
the switch identifier; and
any entry.

16. A computer-executable method, comprising:
storing in a storage device a data structure comprising an entry including a media access control (MAC) address of a remote end device, wherein the MAC address is learned at a port of a remote switch, and wherein the remote end device is distinct from the remote switch; and
wherein the entry further includes a switch identifier of the remote switch, an identifier of the port from which the remote switch has learned the MAC address, and a type indicator of the MAC address, wherein the type indicator indicates a type of the MAC address; and
managing the entry in the data structure based on the switch identifier and the interface identifier.

17. The method of claim 16, further comprising storing a virtual local area network (VLAN) tag associated with the MAC address in the entry.

18. The method of claim 16, further comprising removing one or more entries from the data structure based on one or more of:
the identifier of the port;
a VLAN tag;
the switch identifier; and
any entry.

19. The method of claim 16, further comprising displaying contents of a respective entry in the data structure via a display device.

20. The method of claim 16, further comprising maintaining a membership in a network of interconnected switches, wherein a respective switch of the network is configured to store a copy of the data structure.

* * * * *